No. 730,235. PATENTED JUNE 9, 1903.
J. W. COVER.
CABLE COUPLING.
APPLICATION FILED MAY 24, 1902.
NO MODEL.

WITNESSES:
Julia M. McLaughlin
Nellie A. Gill

INVENTOR
John W. Cover
BY H. L. Reynolds
his ATTORNEY

No. 730,235. Patented June 9, 1903.

UNITED STATES PATENT OFFICE.

JOHN W. COVER, OF BOSTON, MASSACHUSETTS.

CABLE-COUPLING.

SPECIFICATION forming part of Letters Patent No. 730,235, dated June 9, 1903.

Application filed May 24, 1902. Serial No. 108,854. (No model.)

*To all whom it may concern:*

Be it known that I, JOHN W. COVER, a citizen of the United States, residing at Boston, Suffolk county, Massachusetts, have invented a new and useful Improvement in Cable-Couplings, of which the following is a specification.

My invention relates to an improvement in devices employed for connecting the ends of cables, and is especially designed for connecting the ends of a cable which is to be used as an endless belt and to pass about a wheel or pulley. My invention comprises the novel features hereinafter described, and particularly pointed out in the claims.

Figure 1:
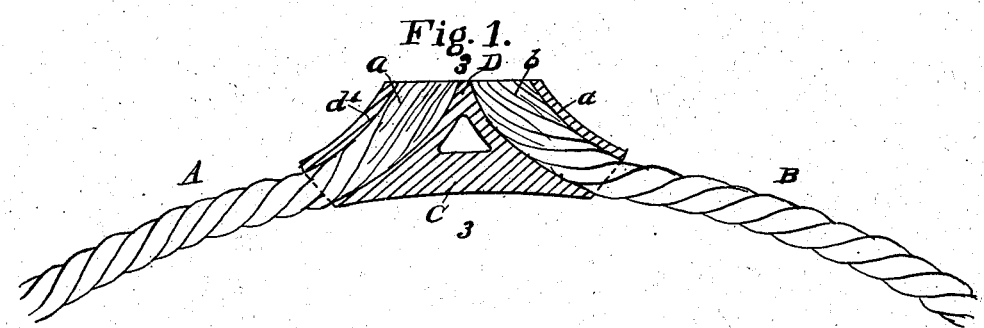
Figure 2:
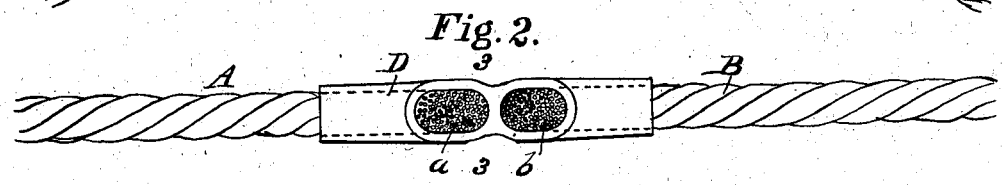
Figure 3:
Figure 5:
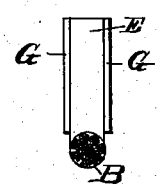
Figure 4:
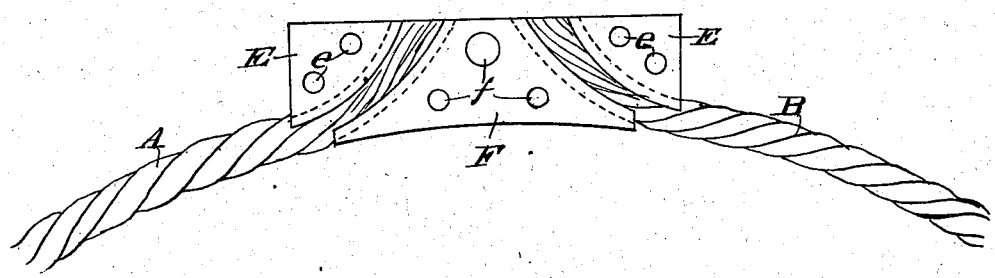

Figure 1 is a sectional elevation of my device and of the cable ends secured thereby. Fig. 2 is a top plan view of the same, and Fig. 3 is a section upon the line 3 3 of Figs. 1 and 2. Fig. 4 is a side elevation of a built-up form of construction with one side plate removed, and Fig. 5 is an end view of the same.

While my invention may be employed for connecting cable ends generally, it is especially designed for connecting the ends of cables which are to pass over a pulley or sheave, and will herein be described as employed for this purpose.

As shown in the drawings, the connecting member D is shown as consisting of a single casting provided with curved channels or holes $d'$ $d$, adapted to respectively receive the ends $a$ $b$ of cables A B, which may be different cables or the two ends of the same cable. The cable-receiving holes $d$ $d'$ are tapered somewhat, the smaller end being at the end of the connection where the cable enters and the larger end being toward the center and at the upper side.

The portion C, which connects the outer ends of the device substantially in the central line of the cable, is preferably made rounded upon its inner side, (the lower, as shown in Figs. 1 and 3,) so as to fit a groove of the same size as the cables A B. This connecting-bar C is also preferably bent or curved, so as to conform to the peripheral curve of the wheel or pulley about which it is to pass. The coupling therefore passes about a pulley under exactly the same conditions as the cable and neither raises the cable above the surface of the cable-groove nor requires any modification or enlargement of the cable-groove to accommodate it.

In connecting two cable ends by my device one end is first inserted and unraveled for a very short distance, corresponding substantially with the amount of the cable which is to remain in the channel or hole $d$ or $d'$, as the case may be. Molten metal of any convenient kind is then poured into the upper end of this hole among the stranded or raveled wires, which when it hardens securely holds the cable in place. The cable end projecting is then cut off.

If the cable is to be used as a belt or endless conveyer, it is preferred that it be put into place and tightened up to its working tension. While so held its end is inserted within the hole at the other end and similarly secured. The ends of the cable may then be smoothed off flush with the upper or outer side of the coupling. If Babbitt metal or some other easily-fusible metal has been used to secure the cable ends, they may be readily released whenever desired by heating the coupling.

In Figs. 1, 2, and 3 I have shown the coupling as being composed of a unitary casting, as that is the construction preferred by me, but I do not, however, wish to be understood as limiting the invention to such a construction, but to claim the construction set forth in the claims whether composed of one or more pieces. A coupling of this character will pass over a pulley with the same ease as the cable itself and within any groove which will accommodate the cable.

In Figs. 4 and 5 I have shown a compound or built-up construction consisting of the central blocks E, E, and F, having plates G on either side thereof and secured together by rivets or bolts $e$ and $f$. This, in effect, is the same as the device shown in the previous figures, but is not as solid or as cheap to make.

Having thus described my invention, what I claim, and desire to secure by Letters Patent, is—

1. A cable-coupling having a cable-receiving hole extending from each end toward the middle and curving toward one side, said holes increasing in cross-sectional area from the ends toward the center.

2. A cable-coupling having a cable-receiving hole extending from each end toward the center and curving outwardly to one side, said holes being enlarged inward from their outer ends, and a rib connecting the ends of the device substantially in line with the cable and adapted to fit the same groove as the cable.

3. A cable-coupling having a cable-receiving hole extending from each end toward the center and curving outwardly toward one side, said holes being enlarged inwardly from their outer ends, and a rib connecting the ends of the coupling and substantially in line with the cable, said rib being curved to conform to the periphery of the wheel, and shaped on its lower or inner side to fit the same groove as the cable.

In testimony whereof I have signed my name to this specification, in the presence of two subscribing witnesses, this 10th day of May, 1902.

JNO. W. COVER.

Witnesses:
JEHU H. DONOVAN,
EDWARD J. LEARY.